G. R. BOND.
VEHICLE WHEEL.
APPLICATION FILED FEB. 11, 1915.

1,188,723.

Patented June 27, 1916.

Witnesses

G. R. Bond, Inventor,
by Cachrow & Co.
Attorneys.

UNITED STATES PATENT OFFICE.

GEORGE R. BOND, OF ATLANTA, GEORGIA.

VEHICLE-WHEEL.

1,188,723.  Specification of Letters Patent.  Patented June 27, 1916.

Application filed February 11, 1915. Serial No. 7,647.

*To all whom it may concern:*

Be it known that I, GEORGE R. BOND, a citizen of the United States, residing at Atlanta, in the county of Fulton and State of Georgia, have invented a new and useful Vehicle-Wheel, of which the following is a specification.

The present invention appertains to vehicle wheels, and aims to provide a novel and improved resilient or spring wheel adapted especially for use on motor vehicles to supplant the use of pneumatic tired wheels, and which will provide a cushioning effect similar to that provided by a pneumatic tire, and at the same time the objectionable features of a pneumatic tire will be eliminated.

It is also within the scope of the invention to improve vehicle wheels of the nature indicated, whereby the construction will be improved in its details, to enhance the utility thereof, and whereby the structure is comparatively simple, inexpensive and compact, as well as being efficient and practical in use.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawings, wherein—

Figure 1:
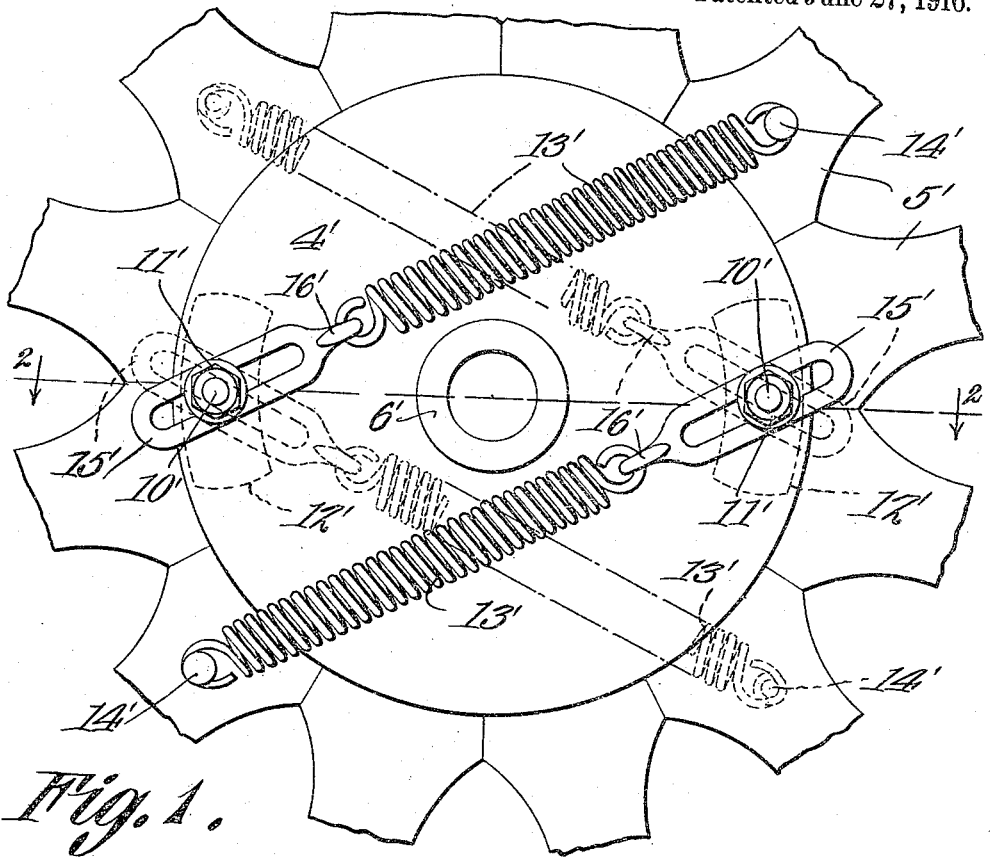
Figure 2:
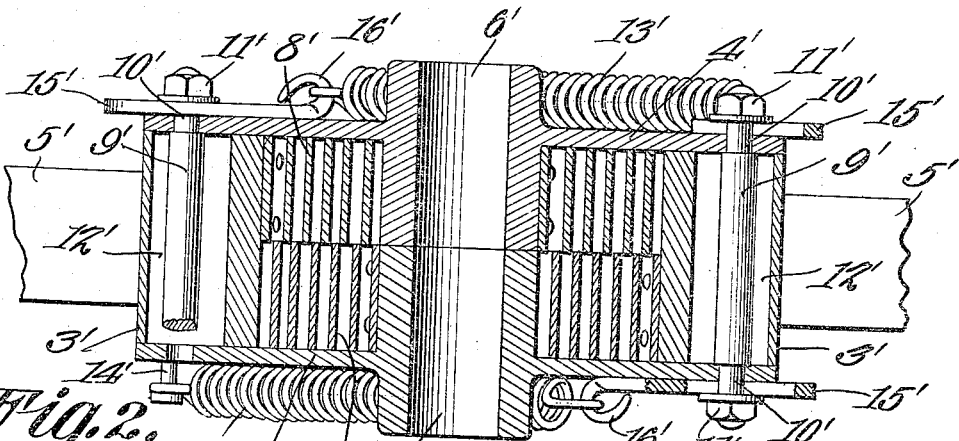

Figure 1 is a fragmental view in elevation of the vehicle wheel. Fig. 2 is a sectional view taken on the line 2—2 of Fig. 1.

In carrying out the invention, an annulus or ring 3' fits between a pair of side plates or disks 4' and has the spokes 5' secured thereto. The plates 4' have central hub sections 6' which coöperate to receive the spindle of the axle for securing the hub 6'—6' to the axle. The structure also embodies oppositely extending spiral springs 8' disposed side by side between the plates 4' and having their inner and outer ends secured to the hub sections 6' and annulus 3'.

A pair of transverse bolts 9' work within arcuate slots 12' provided in the annulus 3', and have reduced end portions 10' engaged through the plates 4' and providing shoulders bearing against the inner faces of the said plates to prevent the plates 4' from clamping the annulus 3' therebetween. Nuts 11' are threaded upon the reduced end portions 10' of the bolts 9' upon the outer sides of the plates 4'.

As a means for yieldably limiting or resisting the relative movements between the plates 4' and the annulus 3' and spokes 5' carried thereby, a pair of oppositely disposed chordal or oblique coiled wire springs 13' are disposed at each side of the hub structure against the outer face of the respective plate 4'. The remote ends of the springs 13' of each pair are engaged to pins or securing elements 14' engaged to opposite spokes 5', and a pair of elongated slotted members 15' are disposed at each side and are provided with hooks 16' for the engagement of the adjacent ends of the respective springs 13'. The slotted members 15' engage the reduced end portions 10' of the bolts 9' between the nuts 11' and the plates 4', whereby when the nuts 11' are loosened, the slotted members 15' may be adjusted for regulating the normal tensions of the springs 13'. The springs 13' at one side balance the springs at the opposite side, and the two pairs of sets of springs resist the movement of the spokes and hub relative to one another in either direction.

Having thus described the invention, what is claimed as new is:

1. In a vehicle wheel, a pair of side plates having a hub, an annular spoke member movable between said plates and having openings, spokes attached to said member, rods connecting said plates and extending loosely through said openings, and chordal springs connecting said rods and the spokes, the springs being arranged to balance one another.

2. In a vehicle wheel, a pair of side plates having a hub, an annular spoke member movable between said plates and having openings, spokes attached to said member, rods connecting said plates and extending loosely through said openings, a plurality of slotted members engaged upon the terminals of said rods at each side of said plates, nuts threaded upon the terminals of said rods for clamping said slotted members in place, and chordal springs connecting said slotted members and the spokes, the springs at each side being arranged similarly and the springs at the opposite sides being reversed.

In testimony that I claim the foregoing as my own, I have hereto affixed my signature in the presence of two witnesses.

GEORGE R. BOND.

Witnesses:
Z. E. MARTIN,
JEANNETTE LOWRY.